United States Patent
Xia et al.

(10) Patent No.: US 10,095,509 B2
(45) Date of Patent: Oct. 9, 2018

(54) SUPPORTING DEVELOPER-USER COLLABORATIVE SOFTWARE REVIEW IN IDE

(71) Applicant: SAP SE, Walldorf (DE)

(72) Inventors: Steven Qian Xia, Singapore (SG); Lin Cao, Singapore (SG)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/614,353

(22) Filed: Feb. 4, 2015

(65) Prior Publication Data

US 2016/0224337 A1   Aug. 4, 2016

(51) Int. Cl.
| | |
|---|---|
| *G06F 8/70* | (2018.01) |
| *G06F 8/71* | (2018.01) |
| *G06Q 10/10* | (2012.01) |
| *G06Q 50/00* | (2012.01) |
| *G06F 8/30* | (2018.01) |

(52) U.S. Cl.
CPC ............. *G06F 8/71* (2013.01); *G06F 8/30* (2013.01); *G06Q 10/103* (2013.01); *G06Q 50/01* (2013.01)

(58) Field of Classification Search
CPC ..................................... G06F 8/30; G06F 8/71
See application file for complete search history.

(56) References Cited

U.S. PATENT DOCUMENTS

| | | | | |
|---|---|---|---|---|
| 7,386,831 B2* | 6/2008 | Flanagan | .................. | G06F 8/75 709/204 |
| 7,395,312 B2* | 7/2008 | Kothari | ..................... | G06F 8/20 709/205 |
| 7,539,943 B2* | 5/2009 | Vaidyanathan | ........... | G06F 8/71 715/744 |
| 7,908,580 B2* | 3/2011 | Stubbs | ..................... | G06F 8/20 717/100 |
| 8,739,112 B1* | 5/2014 | Reed | ......................... | G06F 8/33 717/101 |
| 8,850,385 B2* | 9/2014 | Ahlgren | .................. | G06F 9/468 717/101 |
| 8,990,775 B2* | 3/2015 | Bates | .................... | G06F 11/362 715/758 |

(Continued)

OTHER PUBLICATIONS

Bani-Salameh et al., Integrated Collaborative Program Development and Debugging within a Virtual Environment, 2008, Springer Berlin Heidelberg.*

(Continued)

*Primary Examiner* — Chat C Do
*Assistant Examiner* — Douglas M Slachta
(74) *Attorney, Agent, or Firm* — Jones Day (57) ABSTRACT

A framework for collaborative software development in an integrated development environment (IDE) is described herein. In accordance with one aspect, an application (App) identifier is retrieved by a collaboration component. The App identifier links to a version of the App for a collaborative activity. A message associated to the collaborative activity may be posted in a social network. The collaboration component may then generate a collaboration identifier for the version of the App, where the collaboration identifier encodes the App identifier, a message identifier that links to the message posted in the social network, and an IDE identifier that links to the collaboration component in the IDE.

19 Claims, 6 Drawing Sheets

(56) References Cited

U.S. PATENT DOCUMENTS

| | | | | |
|---|---|---|---|---|
| 2005/0097508 A1* | 5/2005 | Jacovi | G06F 9/4446 | 717/103 |
| 2006/0248504 A1* | 11/2006 | Hughes | G06F 11/3664 | 717/101 |
| 2008/0005235 A1* | 1/2008 | Hegde | G06Q 10/10 | 709/204 |
| 2008/0134298 A1* | 6/2008 | Nathan | G06F 8/20 | 726/4 |
| 2009/0077091 A1* | 3/2009 | Khen | G06F 8/34 | |
| 2009/0099895 A1* | 4/2009 | Carrier | G06F 21/604 | 705/75 |
| 2010/0058294 A1* | 3/2010 | Best | G06F 11/3688 | 717/122 |
| 2011/0055329 A1* | 3/2011 | Abt, Jr. | G06F 17/3089 | 709/205 |
| 2011/0202899 A1* | 8/2011 | Balathandapani | G06F 8/20 | 717/107 |
| 2011/0265081 A1* | 10/2011 | Lucovsky | G06F 8/60 | 717/177 |
| 2013/0110957 A1* | 5/2013 | Siegel | G06F 21/31 | 709/207 |
| 2013/0111443 A1* | 5/2013 | Kedla | G06F 8/71 | 717/122 |
| 2014/0047413 A1* | 2/2014 | Sheive | H04L 65/403 | 717/110 |
| 2014/0089897 A1* | 3/2014 | Deluca | G06F 8/30 | 717/122 |
| 2014/0237387 A1* | 8/2014 | Ryall | H04L 65/403 | 715/753 |
| 2014/0258970 A1* | 9/2014 | Brown | G06F 8/47 | 717/103 |
| 2014/0310678 A1* | 10/2014 | Howard | G06F 8/20 | 717/100 |
| 2015/0135160 A1* | 5/2015 | Gauvin | H04W 4/001 | 717/109 |
| 2016/0004529 A1* | 1/2016 | Xia | G06F 8/665 | 717/178 |
| 2016/0226932 A1* | 8/2016 | Krishna | H04L 65/403 | |

OTHER PUBLICATIONS

Laszlo Szalvay, Issue Tracking in an Agile Development Environment, Jun. 3, 2010, EzineArticles.*

Filippo Lanubile et al. Collaboration Tools for Global Software Engineering, 2010, IEEE Computer Society.*

CodingForums.com Sub-Forums: Javascript Programming, 2002, Jelsoft Enterprises Ltd.*

* cited by examiner

SUPPORTING DEVELOPER-USER COLLABORATIVE SOFTWARE REVIEW IN IDE

TECHNICAL FIELD

The present disclosure relates generally to software development, and more particularly to a framework for collaborative software development in an integrated environment.

BACKGROUND

One key factor to evaluate the success of software development is whether the software meets user's requirements. Therefore, user review is an indispensable step in software development process. The review is collaborative between developers and users. One typical round of user review involves several steps: 1) the developer prepares and presents the current state of the software to the user; 2) the user reviews the software; 3) the user provides feedback; 4) the developer modifies the software according to the user's feedback. Such collaboration may occur repeatedly during the software development process.

The timing and frequency of reviews are important. If the reviews are too infrequent or delayed to a stage that is too late during the development of the software, the user may find that the software does not fulfill the user's requirement and in some cases deviate too far from the user's requirement. Thus, the cost to rectify unfulfilled user requirement would be high. Frequent review, on the other hand, reduces the developer's efficiency. Additionally, the review process itself bears a cost such as, for example, the effort for preparing the software for review, the communication between the developer and the user, etc.

SUMMARY

A framework for integrating collaboration in an integrated development environment (IDE) is described herein. In accordance with one aspect, the framework integrates a collaboration feature in an integrated development environment (IDE). The collaboration feature, in one implementation, supports collaborative review between developers and end-users during the software development process. In one implementation, the IDE may include a collaboration component that communicates with a revision control server and a social network. For instance, the revision control server may be employed to store source files of the application being developed by developers while the social network may be used to support discussion and store related messages generated by developers and users.

In one implementation, an application (App) identifier is retrieved by the collaboration component. The App identifier links to a version of the App for a collaborative activity. A message associated to the collaborative activity may be posted in a social network. The collaboration component may then generate a collaboration identifier for the version of the App, wherein the collaboration identifier encodes the App identifier, a message identifier that links to the message posted in the social network, and an IDE identifier that links to the collaboration component in the IDE.

The integrated environment advantageously facilitates software development tasks within the integrated environment such as, inter alia, previews of the software being developed to users, trial and review of the software by users, discussion during the software development by users and developers, feedback and change requests by users, tracking or managing change requests by developers, and making new preview versions by developers that targets selected change requests of users. With these tasks integrated into the IDE where developers perform regular software development, the effort of performing these tasks is largely reduced for both developers and users.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures. Like reference numerals in the figures designate like parts.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent or being separate in their performance.

A framework for collaborative software development is described herein. In accordance with one aspect, the framework provides an integrated environment that enables collaborative software development (e.g., software applications or Apps) among users during the software development process. The framework integrates a collaboration feature in an integrated development environment (IDE). In one implementation, the collaboration feature supports collaborative review between developers and end-users of the software. The IDE may include a collaboration component that communicates with a revision control server and a social network. For instance, developers may collaborate with end-users via the social network to obtain user review of the App to ensure that the software development is on track to meet user requirements. Examples of end-users or users of the software include individuals, businesses, corporate entities.

The integrated environment advantageously facilitates software development tasks within the integrated environment such as, inter alia, previews of the software being developed to users, trial and review of the software by users, discussion during the software development by users and developers, feedback and change requests by users, tracking or managing change requests by developers, and making new preview versions by developers that targets selected change requests of users. With these tasks integrated into the IDE where developers perform regular software development, the effort of performing these tasks is largely reduced for both developers and users. Further, the framework advantageously allows the developer and user to easily communicate within the context of the App that is being reviewed during the development process. Such advantages facilitate an improved and efficient software development process.

The framework described herein may be implemented as a method, computer-controlled apparatus, a computer process, a computing system, or as an article of manufacture such as a computer-usable medium. These and various other features will be apparent from the following description.

Figure 1:
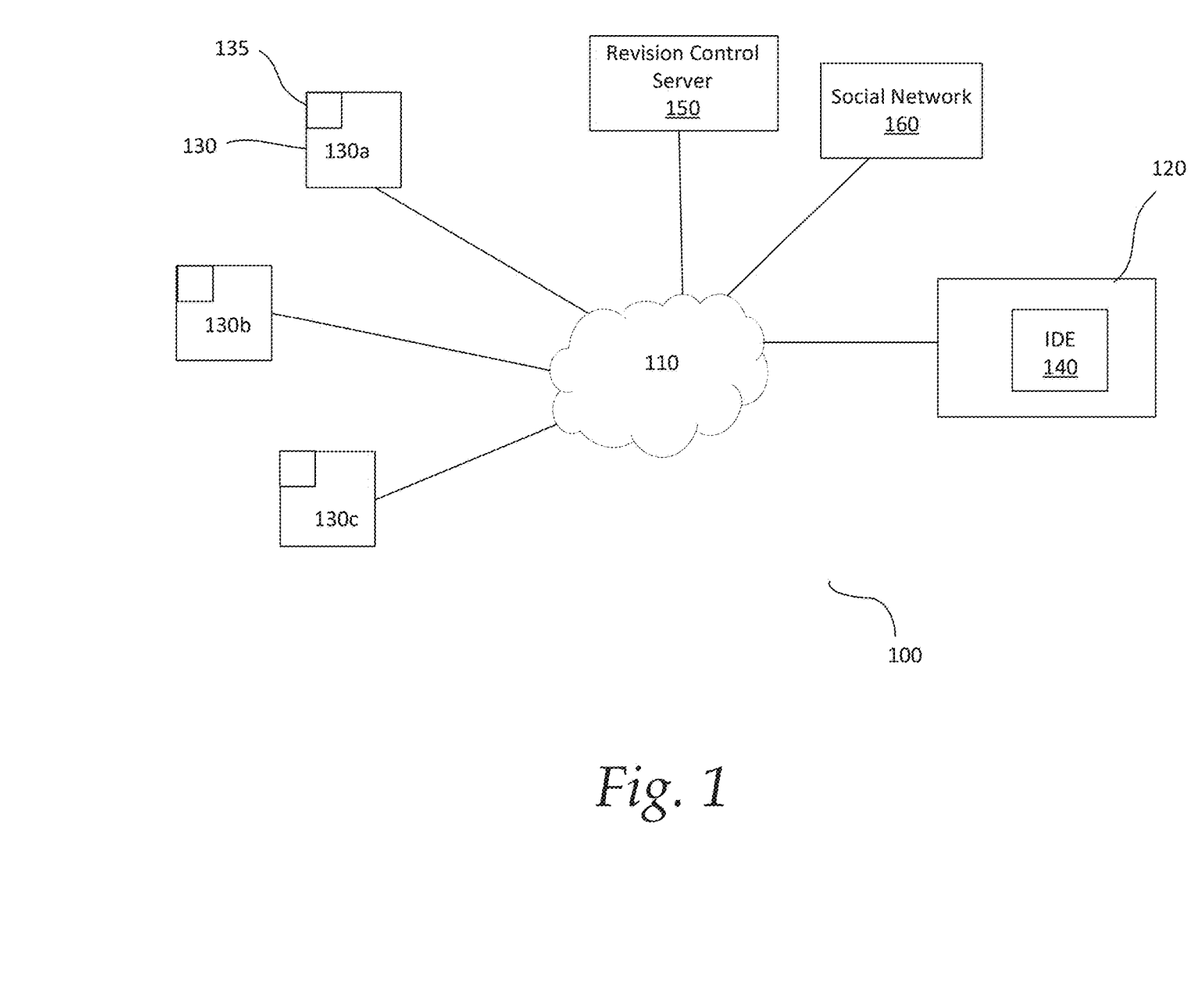
FIG. 1 shows an implementation of an environment.

FIG. 1 shows a simplified diagram of an exemplary environment or architecture 100. Environment 100 may have a distributed architecture, such as a client-server architecture. The environment, in one implementation, includes a communication network 110. The communication network, for example, may be the World Wide Web (WWW or Web). Other types of communication networks or combination of networks may also be useful.

The environment includes a server 120. A server may be a computer with a memory and a processor. Various types of computers may be employed for the server. For example, the computer may be a mainframe, a workstation, as well as other types of processing devices. The memory of a computer may include any memory or database module. The memory may be volatile or non-volatile types of non-transitory computer-readable media, such as magnetic media, optical media, random access memory (RAM), read-only memory (ROM), removable media, or any other suitable local or remote memory component.

The server 120, for example, may be a plurality of interconnected servers. For example, the servers are interconnected by a communication network. The communication network may be an internet, an intranet, a local area network (LAN), a wide area network (WAN) or a combination thereof. The servers may be located in a single or multiple locations. The interconnected servers may be collectively referred to as a server.

The server 120 is configured to store and process resources requested by client devices 130. A client device may be a local computing device with, for example, a local memory and a processor. The memory may be volatile or non-volatile types of non-transitory computer-readable media, such as magnetic media, optical media, random access memory (RAM), read-only memory (ROM), removable media, or any other suitable local or remote memory component. Various types of processing devices may serve as the client device. For example, the client device may be a personal computer, a tablet, a workstation, a network computer, or a mobile computing device, such as a laptop, a tab or a smart phone. Other types of processing devices may also be used.

The environment of the client device 130 may be referred to as a local environment. The client device 130 may be employed by users (e.g., developers or end-users) during the software development process. A user, and client device may be used interchangeably. For example, when referring to user, it is understood that the user connects to the communication network using a client device. The client device may be referred to as the client side while the server may be referred to as the server side. It is understood that client devices need not be of the same type. For example, some client devices may be mobile devices running of different types of platforms, such as iOS or Android, while other devices may be desktop or laptop computers.

In one implementation, the local environment of the client device includes a user agent 135. The user agent, for example, may be a web browser. The browser facilitates communication with the server 120. For example, the server 120 may be a web server and the browser initiates communication to the web server by making a request for a specific resource. The request may be made using, for example, a Hypertext Transfer Protocol (HTTP) and the server responds with the content of that resource. Communication with the server, for example, may be through internet connection. The internet connection may be using a mobile telecommunication network, such as a 4G network. Other types of connections to the server may also be useful. A user may access the server by, for example, having a user account.

In some implementations, the environment 100 may be a cloud computing environment. In such cases, the interconnected servers 120 form a cloud. The cloud, for example, hosts and processes resources, such as applications and data, as well as other resources. Different servers may be used to store or process different resources. Such hosting and processing may be considered as cloud services. Various types of cloud services may be provided. The cloud services may be provided in a public, private or hybrid network. The cloud services may be provided by a cloud service provider. For example, the cloud services may be SAP HANA Cloud Platform provided by SAP SE. Other types of clouds and cloud providers may also be useful. A client device 130 accesses resources on the cloud using, for example, a web browser 135. Other configurations of the environment may also be useful.

The environment 100 includes a software development system 140. The software development system 140 is a software tool for developing applications (Apps). The development tool, for example, is used to develop web Apps. The software development system supports collaboration features during software development. In one implementation, the development tool is an integrated development environment (IDE). The IDE may be a wizard-based IDE. For example, the IDE includes wizards to guide the developer in developing Apps. In one implementation, the IDE is a web-based or web IDE residing in the server 120. In some implementations, the IDE resides on the cloud. The web IDE is accessed by a web browser 135 on a client device 130. For example, a developer or end-user may log on to the cloud, accessing the IDE from the web browser of a client device. The IDE, for example, may be a SAP Web IDE from SAP SE. Other types or configurations of IDEs may also be useful.

In one implementation, the environment 100 includes a revision control server 150. The revision control server 150 may be employed to store source files of the App that is being developed, store software resources and track revisions from multiple developers working on the same project. The revision control server 150 allows multiple developers to work on the same project. In one implementation, the revision control server stores the identifier of an App (App identifier) that has been checked in by a developer. In the case where more than one version of the App is checked in, the revision control server may maintain and store the identifiers for all versions of the App. As such, each version of the App that is checked in may have its respective App identifier stored in the revision control server. The revision control server may be any revision control server such as, for example, CVS, GIT, etc. In some implementations, the revision control server 150 may be an external server. Other configurations of the revision control server may also be useful. For example, the revision control server may be part of the server that hosts the IDE, such as server 120.

The environment 100 may be connected to social network system 160 to support discussion and store related messages generated by developers and users during development of an App. For example, the social network 160 may be Facebook, SAP Jam, etc. In one implementation, the social network 160 may be an external social network system that allows multiple users to post messages and perform discussion. Other configurations of the social network may also be useful. For example, the social network may be part of the server that hosts the IDE, such as server 120.

Figure 2:
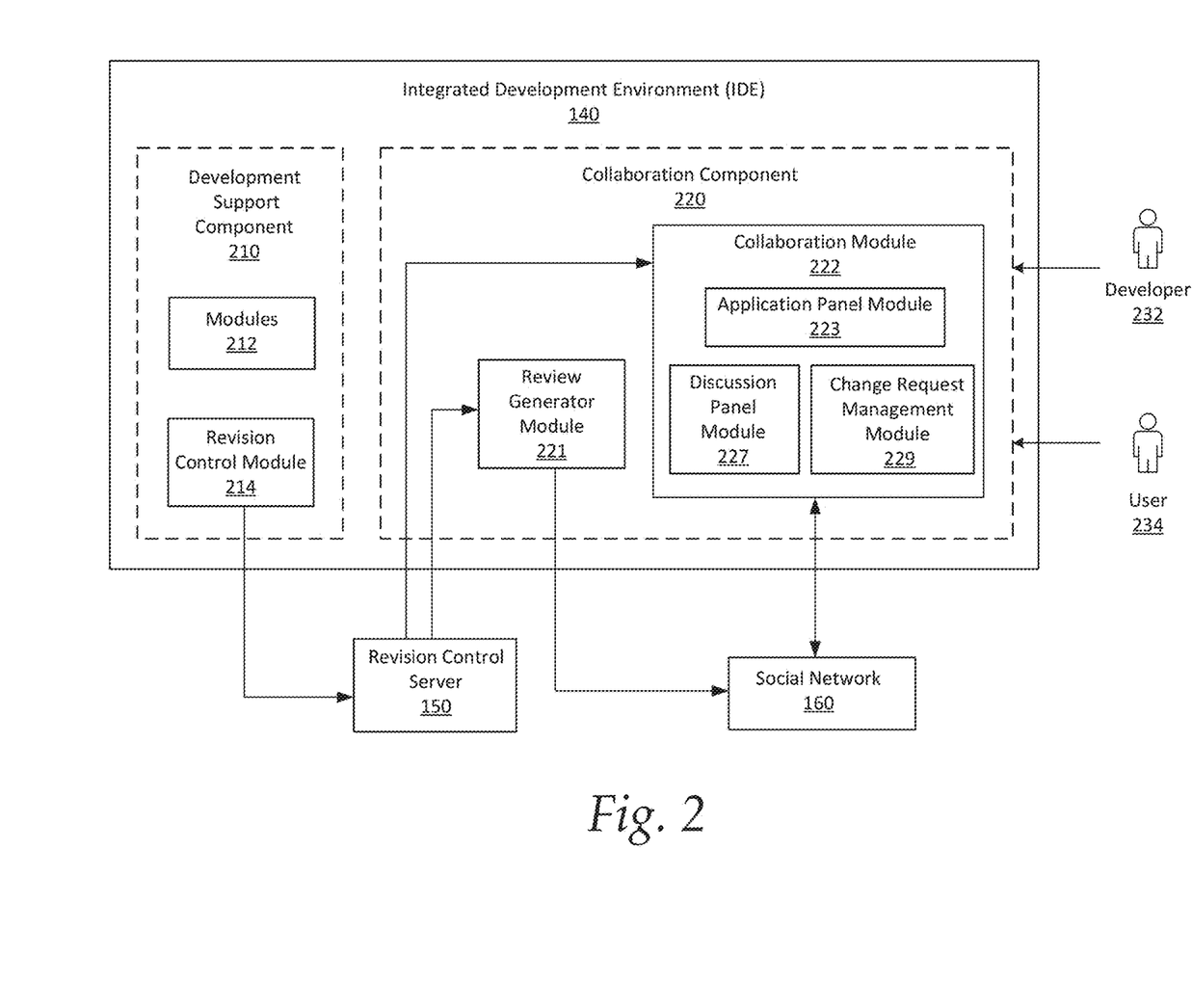
FIG. 2 illustrates an exemplary integrated development environment in greater detail.

FIG. 2 shows a simplified block diagram of an implementation of a software development system or IDE 140 in greater detail. The IDE includes a development support component 210 and a collaboration component 220. The collaboration component 220 may be integrated with the development support component within the IDE to form an integrated environment for collaborative software development. The integrated environment, in one implementation, facilitates collaborative review between developers and users of an App during its development.

The development support component 210 includes various modules 212 for developing an App. For example, in the case of a web IDE, the development support component includes modules for developing a web App. The modules 212 may perform traditional software development features as those of a typical IDE. The module 212, for example, may support features such as file browsing, file editing, debugging, etc. For instance, the modules 212 may include, inter alia, a UI module, a resource module and a code module for creating and developing an App. Providing different or additional modules may also be useful.

In one implementation the development support component 210 includes a revision control module 214. The revision control module 214 serves to communicate with the revision control server 150. The revision control module 214 communicates with the revision control server 150 to check in changes from a developer and check out changes from other developers into the developer's workspace. For example, after performing changes to an App during the development process, a developer 232 may check in the current version (i.e., latest version) of the App to the revision control server. The check in of the App may be for an App that is to be reviewed for the first time or an updated version of an App that was previously sent for review. As such, the revision control server may maintain and store all versions of the App that have been checked in. This allows the developer to create a preview of a preferred version of the App at any time.

As for the collaboration component 220, it includes various modules for supporting the collaborative software review during the software development process. The collaboration component, for example, supports collaborative review between developers and end-users of the App. In one implementation, the collaboration component includes a review generator module 221 and a collaboration module 222. Providing different or additional modules may also be useful.

The review generator module 221 serves to initiate the software review. The review generator module may initiate the software review in response to a request to obtain user review of a version of the App by a developer. In one implementation, the review generator module retrieves an identifier of the version of the App that is to be reviewed from the revision control server 150. For example, the review generator module retrieves an App identifier that corresponds to the latest version of the App which is checked in at the revision control server. The App identifier enables access to the App and runs the App. The App identifier, for example, may be the Uniform Resource Locator of the App (App URL). Providing other types of App identifier may also be useful.

The review generator module 221 publishes or posts a message regarding the version of the App in a social network system 160. If the App is published for the first time in the social network, a review topic is created. In other words, a new review topic is created if it is the first time a request for user review of the App is published and no previous version has been published for user review. If the App is an updated version with changes to a previously published version, the review generator module publishes a follow-up message (i.e. reply) to the previously created topic. The content of the message, for example, may include indications of the status of the App, version of the App and request to review. Other information such as date of latest revision, App information and other message from the developer may also be included in the message.

In one implementation, the review generator module 221 generates an identifier for the review (collaboration identifier or Review identifier) and returns the Review identifier to the developer 232. The Review identifier may be unique to that version of the App. The Review identifier, for example, may be a URL (Review URL). The developer may send the Review URL to one or more users 234 for reviewing the App. The Review URL contains a direct link to the collaboration component, with which users can access the review functionality. The Review URL may be advantageously generated by the developer with a single mouse click in the IDE where he or she performs daily development task. As such, the developer does not need to leave the IDE to initiate a collaborative review. The Review URL may be sent by the developer to other users with any communication tool such as email or online chat media.

Figure 3:
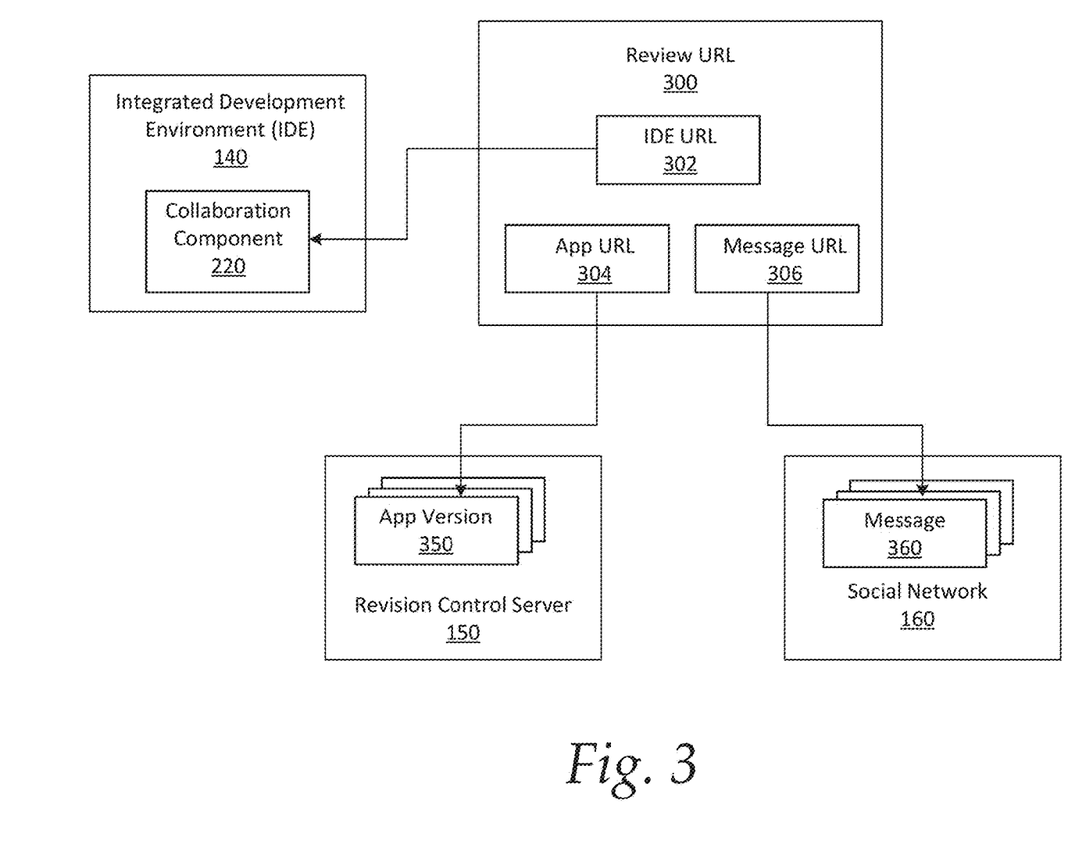
FIG. 3 illustrates key data structure of a Review URL.

FIG. 3 illustrates exemplary key data structure of the Review URL 300. The Review URL encodes 1) IDE URL 302, which is the identifier of the IDE, and more particularly, the identifier of the collaboration component; 2) App URL 304 which points to the latest App version 350 in the revision control server that the developer has requested for user review; and 3) the Message URL 306, which points to the messages 360 associated to the App in the social network. The messages, for example, may include all message posted by users and developers into the social network during development of the App. The messages may be stored in the social network. Providing other configurations and data structure of the Review URL may also be useful.

Returning to FIG. 2, the collaboration module 222 serves to provide a user interface (UI) to users for reviewing the App. The UI, for example, may be presented at a web browser of a client device for users to review a version of the App as requested by the developer. Users may review the version of the App, for example, by inputting the corresponding Review URL received from the developer into the web browser. The web browser uses the IDE URL, which is encoded in the Review URL, to load the collaboration component 220. Additionally, the web browser passes the App URL and Message URL to the collaboration component 220 while loading it.

The collaboration module 222 includes sub-modules such as an application panel module 223, a discussion panel module 227 and a change request management module 229. The application panel module loads and runs the App, and supports portion of the UI to review the App. The version of the App that is run corresponds to the App URL, which is encoded in the Review URL. The application panel module enables users to inspect and try the App. The discussion panel module 227 provides logic for supporting developer and user discussion. For instance, the discussion panel module loads discussion and messages associated to the App from the social network. As discussed, the messages may include all messages, including those posted in relation to the current version as well any previous versions that have been previously posted in the social network. The change request management module 229 enables users to raise change requests and allows the developer to trace change requests. Providing different or additional modules may also be useful.

After receiving the Review URL, the user 234 may open the Review URL. For example, Review URL may be opened by clicking the Review URL in the email or copying the Review URL into the address bar of a web browser. The App may be rendered by the UI of the collaboration component via a web page of the web browser. The web browser may access the collaboration component of the IDE using the IDE URL encoded in the Review URL.

Figure 4:
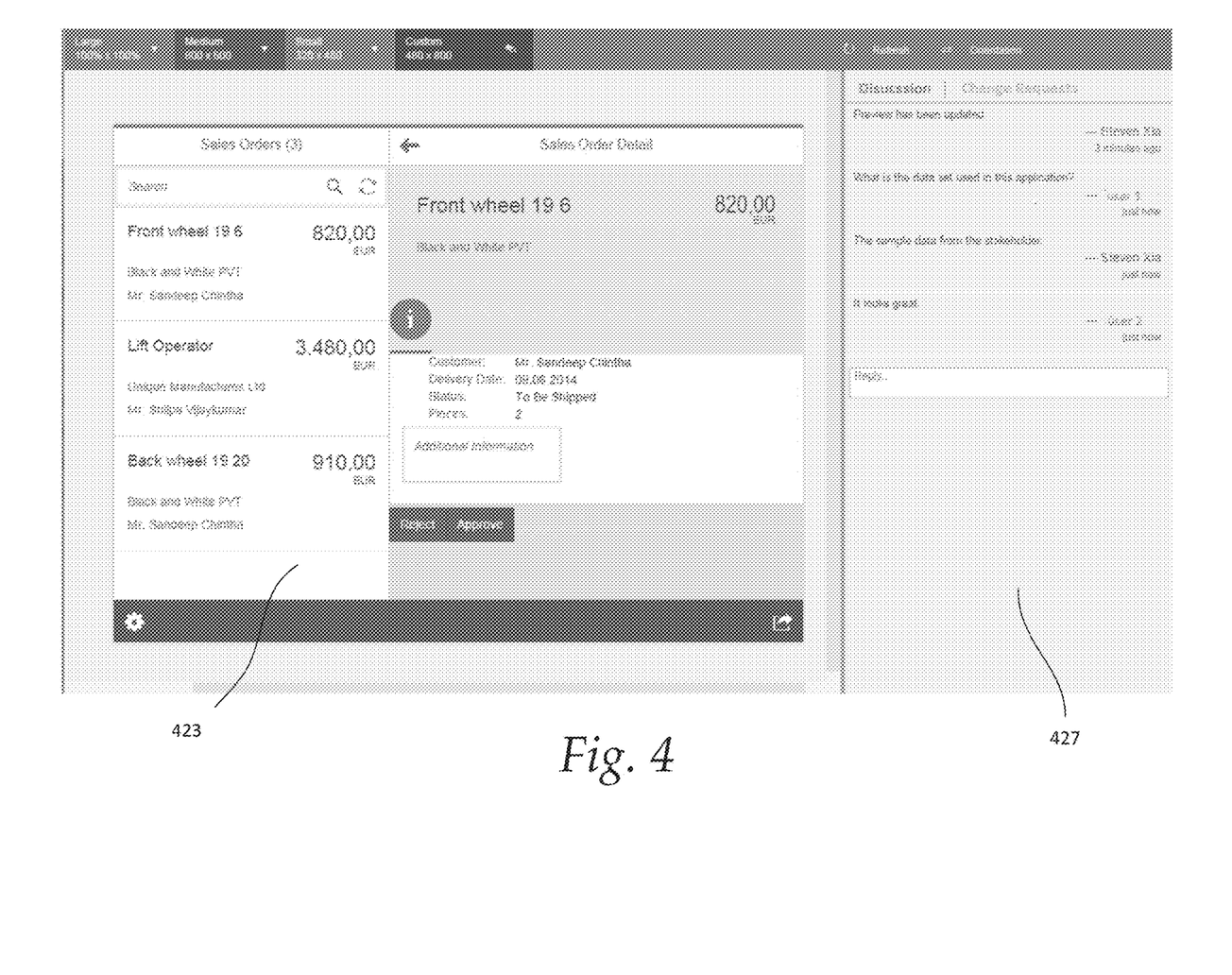
FIG. 4 illustrates a user interface (UI) for user review of an App and discussion during a software development process.

FIG. 4 illustrates a user interface (UI) for user review of an App and discussion during the software development process. As shown, the UI includes an application panel 423 and a discussion panel 427 that facilitates review and/or discussion of a version of the App. With the App URL encoded in the Review URL, the application panel module loads the App from the revision control server and runs the App. The App, as discussed, is a version corresponding to that App URL. The application panel 423 enables the user to try the App and check whether it meets his or her requirements. As for the discussion panel module, using the Message URL encoded in the Review URL, it loads all messages from the social network and displays the content in the discussion panel 427. The messages, for instance, includes all the messages associated to the topic that is created for the App. The messages provide the user with information of the App such as, for example, status of the App, review changes, and the review version. Additionally, the discussion panel 427 allows the user to leave comments or ask questions.

The developer itself may also use the Review URL to access the collaboration component for reviewing the App. The developer may be presented with the same UI that is presented to the user 234. For example, the UI includes the application panel and the discussion panel. In the discussion panel, the developer 234 may view user comments and questions. Additionally, the discussion panel allows the developer to input comments or respond to user questions.

Figure 5:
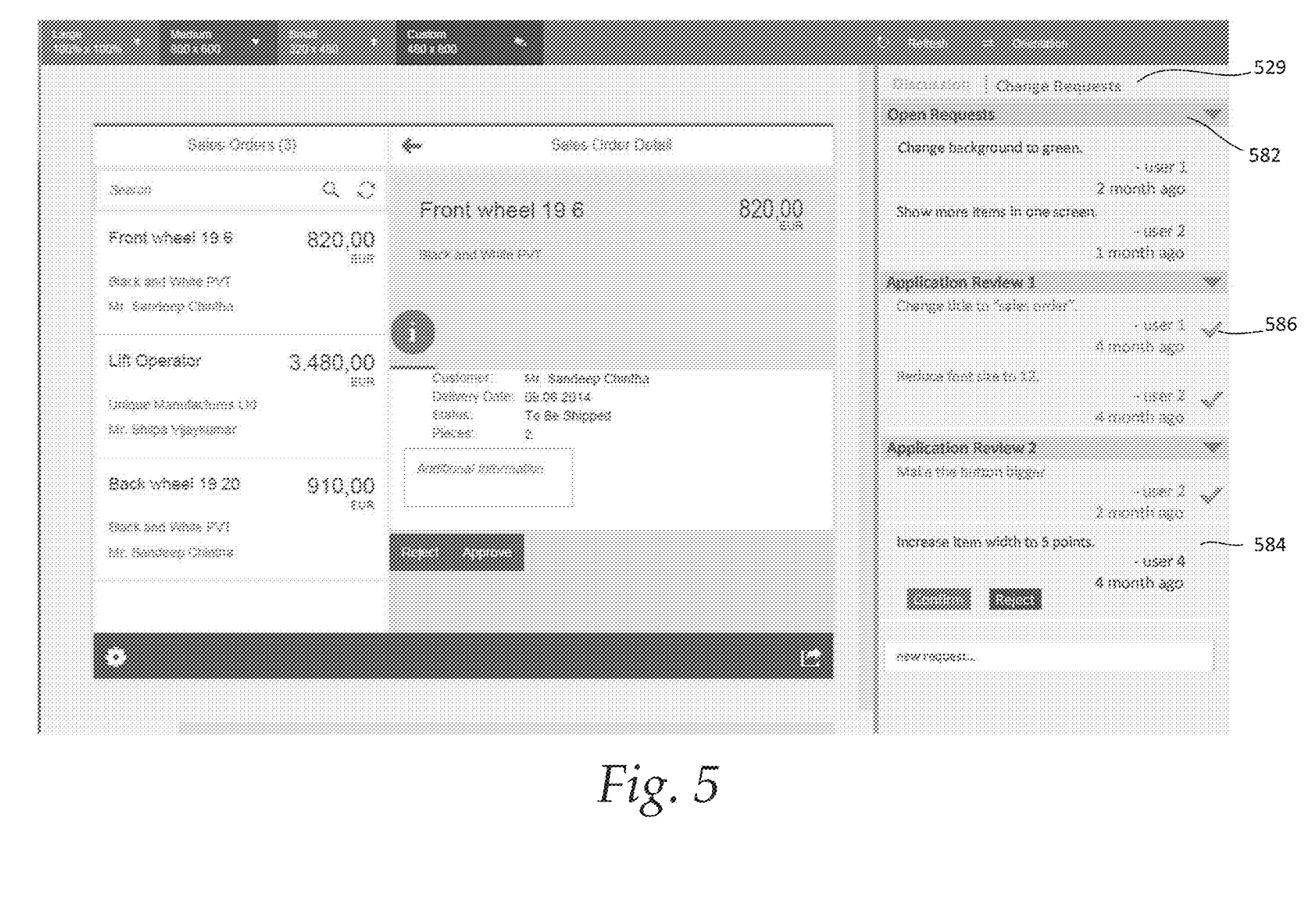
FIG. 5 illustrates a UI to manage change requests.

In the case where a user desires to request the developer to make changes to the App, he or she can switch to a change request function to input a change request. FIG. 5 illustrates a UI to manage change requests. As shown, the UI includes a change request panel 529 for managing change requests. Once a change request is created, it is listed at the top of the change request panel as an open request 582. The developer may also access the change request panel to view change requests created by one or more users.

The developer may continue to develop the App in the IDE and perform changes to the published version of the App. At a later stage of the development process, the developer may desire to obtain an updated user review for an updated version of the App. The developer may again, in the IDE, check in changes into the revision control server. To obtain user review of the updated App, the developer may request for user review of the version that has just been checked in. For example, the developer may click a button or select a menu item in the IDE. This step is the same for requesting for review for the first time or requesting for an updated review. The review generator module 221 may determine whether the review for the App is the first (i.e., initial) or an updated one (i.e., follow-up review).

The review generator repeats the step of retrieving the App URL from the revision control server. The App URL points to the updated version of the App with the most recent check in from the developer, and is different from the URL of an earlier version of the App which has been published in the social network. The review generator repeats the step of posting a message to the social network to notify one or more users regarding the updated version of the App for review. In this instance, the message is posted as a follow-up or reply message to a previous review topic for that App. In other words, no new review topic is created in the case where a review topic has been previously created for an App in the social network. This effectively ensures that all posted messages during development of the App are associated to the same review topic. The review generator then creates another Review URL and returns the Review URL to the developer. The developer may send the Review URL to one or more users for another review.

Additionally, the developer may indicate change requests which have been fulfilled in the updated version of the App. For example, while creating the updated review, the developer may select and indicate which change requests are fulfilled in that update. This information may be indicated in the message posted to the social network.

When a user uses the latest Review URL received from the developer to access the collaboration component of the IDE, he or she may review the updated App. The user may view the message regarding the App update from the developer in the change request panel 529 of the UI. The change request panel may also identify the change request that has been fulfilled in that update. The fulfilled change request may be displayed as pending requests 584. Each pending request, for example, may have two UI buttons, which allows a user to confirm the fulfillment of the change or reject it. Once a fulfilled change request is confirmed, it becomes a confirmed request. The confirmed request, for instance, may be denoted by a UI element 586 such as a check. If a fulfilled change request is rejected, it becomes an open request 582 and may be listed at the top portion of the change request panel. A user may only confirm or reject change requests created by him or her.

Figure 6:
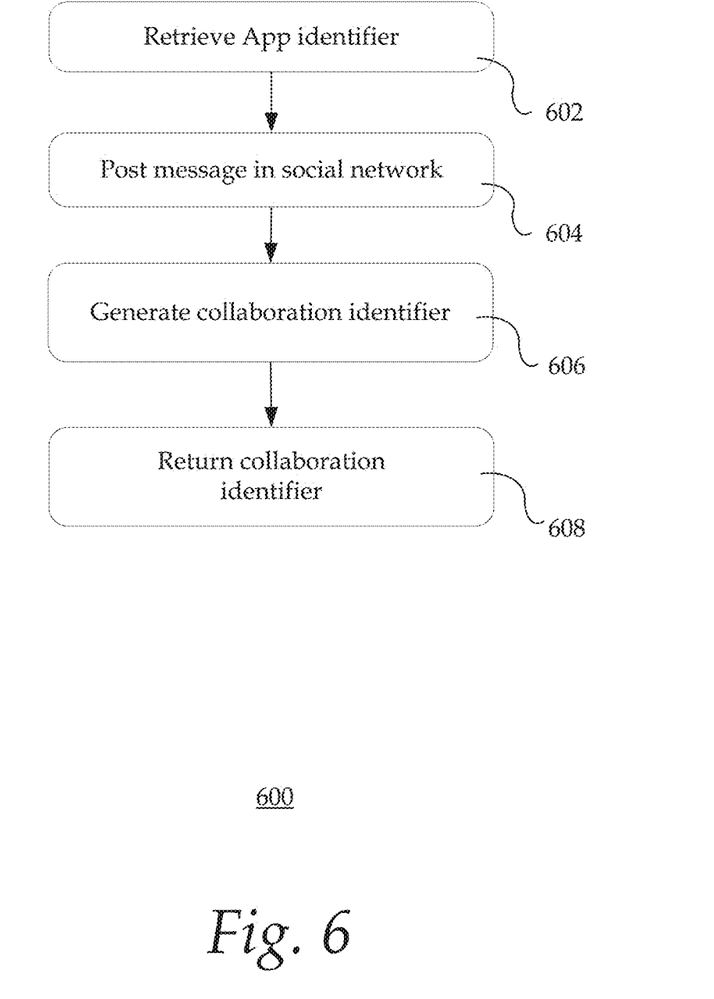
FIG. 6 illustrates an exemplary implementation of a process.

FIG. 6 illustrates an exemplary implementation of a process 600 for facilitating collaborative software development in an IDE. The IDE system of FIGS. 1-2 may be configured by computer program code to implement the process represented by the process 600. While process 600 describes a series of acts that are performed in sequence, it is to be understood that process 600 is not limited by the order of the sequence. For instance, some acts may occur in a different order than that described. In addition, an act may occur concurrently with another act. In some instances, not all acts may be performed.

At 602, the collaboration component retrieves an application (App) identifier from the revision control server. The App identifier may be retrieved in response to a request by a user to initiate a collaborative activity for an App. The collaborative activity, in one implementation, may be a collaborative review of the App between developers and users during the software development process. In one implementation, the App identifier links to the version of an App that a developer desires to obtain user review. The App identifier retrieved for the collaborative review, for example, links to the latest version of the App that is checked in at the revision control server.

At 604, the collaboration component posts a message in a social network. The message includes an indication of the version of the App for the collaborative activity. In the case where the App is a first version for the collaborative review, the message may be posted under a new topic. In other implementations, the App may be an updated version in a collaborative review process. In such case, the App may be posted as a reply message in a previously created topic.

At 606, the collaboration component generates a collaboration identifier for the version of the App. For example, the collaboration identifier may be Review URL that facilitates a collaborative review for the latest version of the App as checked in by the developer. The collaboration identifier may be unique to that version of the App. The collaboration identifier, in one implementation, encodes the App identifier, a message identifier that links to messages associated to the App in the social network, and an IDE identifier that links to the collaboration component in the IDE.

At 608, the collaboration component returns the collaboration identifier to the developer. The developer may send the collaboration identifier to one or more users for participating in the collaborative review. As discussed, the collaborative identifier (or Review identifier) directly links to the collaboration component. The users may access the collaboration component using the collaboration identifier. For example, the collaboration identifier may be input into the address bar of a web browser, where the users may be redirected to a web page of the collaboration component. The web browser uses the IDE identifier to load and run the collaboration component in the web page. The collaboration component loads the version of the App for user review using the App identifier and renders a user interface which is configured for users to interact and review the version of the App. Additionally, the user interface rendered by the collaboration component is configured for the user to post and view messages that are published in the social network. The user interface may also be configured for developers and users to manage change requests.

The collaborative activity or collaborative review, as described, may occur repeatedly and in parallel with the software development process. The IDE may be embodied as an application. For example, the IDE may be embodied as a software application. The different components of the system may be separate software applications configured to operate or interact with each other, whether on the cloud or on the client devices. The source code of the applications may be compiled to create an executable code. The codes, for example, may be stored in a storage medium, such as one or more storage disks or in memory of a server and/or client devices. Other types of storage media may also be useful.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method of integrating collaboration in an integrated development environment (IDE), comprising:

creating, by a development component, a workspace for a first user for developing an application (App), wherein the development component includes a revision control module for communicating with a revision control server external to the IDE to check in changes of the App from the first user, check out changes from other users into the workspace of the first user, and manage versions of changes of the App checked in by users in the revision control server, wherein the versions of changes are based on time of check in to the revision control server with version of changes last checked in being the current or most recent version;

retrieving, by a collaboration component, an application (App) identifier, wherein the App identifier links to a version of an App for review in a collaborative activity;

automatically posting, by the collaboration component without further human intervention, a request for review message associated to the version of the App in a social network external to the IDE, the social network allowing a plurality of authorized users to review the message and comment on same, wherein if the version of the App for review is a first version which is a newly created App, the request for review message includes creating a new review topic for reviewing the App, and if the App for review is not the first version, the request for review message includes posting a follow-up or reply message to a previously created review topic related to the App;

generating, in response to a single mouse click in the IDE, a collaboration identifier for the version of the App by the first user using the collaboration component within the IDE, wherein the collaboration identifier is unique to the version of the App, the collaboration identifier includes a direct link to the collaboration component, the collaboration identifier encodes the App identifier, the App identifier links the version of the App, a message identifier that links to the request for review message posted in the social network, and an IDE identifier that links to the collaboration component in the IDE;

at sending, by the first user, the collaboration identifier to one or more other users of the collaboration, wherein the one or more other users of the collaboration access the collaboration component and the version of the App directly using the collaboration identifier; and rendering, by a collaboration component using the App identifier, a user interface configured to manage and trace change requests from the one or more other users to the first user to make changes to the App, wherein the user interface rendered by the collaboration component is configured to allow the user to post and view messages that are published in the social network.

2. The computer-implemented method of claim 1 wherein the user interface is further configured to enable the first user to select and indicate which of the change requests are fulfilled or rejected.

3. The computer-implemented method of claim 1 wherein the identifiers are uniform resource locators (URLs).

4. The computer-implemented method of claim 1 wherein the App identifier is retrieved from the revision control server.

5. The computer-implemented method of claim 4 wherein the retrieved App identifier corresponds to the current or most recent version of the App that is checked in at the revision control server.

6. The computer-implemented method of claim 1 wherein the collaboration component retrieves the App identifier in response to a request initiated by the first user to collaborate on the version of the App.

7. The computer-implemented method of claim 6 comprising redirecting a second user by a web browser to a web page of the collaboration component via the collaboration identifier.

8. The computer-implemented method of claim 7 wherein the web browser uses the IDE identifier to load the collaboration component in the web page.

9. The computer-implemented method of claim 8 wherein the collaboration component loads the version of the App using the App identifier and renders a user interface configured for users to interact and review the version of the App.

10. The computer-implemented method of claim 9 wherein the user interface rendered by the collaboration component is further configured for the user to post and view messages in the workspace, wherein the messages are published in the social network.

11. The computer-implemented method of claim 10 wherein the messages are posted under a previously created topic as follow up messages if another review of the App is published in the social network.

12. The computer-implemented method of claim 11 wherein all messages associated to the App in the social network is accessed via the message identifier.

13. A system for integrating collaboration in an integrated development environment (IDE), the system comprising:
 a processor unit; and
 a memory unit for storing
 a review generator module, wherein the review generator module causes the processor to
 retrieve an application (App) identifier, wherein the App identifier links to a version of an App for a collaborative review of the App, and
 automatically post, without further human intervention, a request for review message associated to the collaborative review in a social network, the social network being external to the IDE and allowing a plurality of authorized users to review the message and comment on same, wherein
 if the version of the App for review is a first version which is a newly created App, the request for review message includes creating a new review topic for reviewing the App, and
 if the App for review is not newly created, the request for review message includes a follow-up or reply message to a previously created review topic related to the App,
 a collaboration module, the collaboration module causes the processor to generate, in response to a single mouse click in an IDE, a Review identifier for the version of the App, wherein the Review identifier is unique to the version of the App, the Review identifier includes a direct link to a collaboration module, the Review identifier comprises the App identifier, the App identifier links to the version of the App, a message identifier that links to the message posted in the social network, an IDE identifier that links to the collaboration module, and
 wherein the Review identifier, when sent to one or more other users of the collaboration, enable the one or more other users of the collaboration to directly access the collaboration module and the version of the App using the Review identifier;
 wherein the collaboration module loads and runs the version of the App, via a web browser, using the App identifier and renders a user interface configured for users to interact and review the version of the App and to post and view messages that are published in the social network.

14. The system of claim 13, wherein the App identifier is a uniform resource locator (URL) retrieved from a revision control server external to the IDE.

15. The system of claim 13, wherein the collaboration module loads
 messages associated to the App in the social network, via the web browser, using the message
 identifier and displays a discussion panel at the user interface for discussion regarding the App.

16. The system of claim 13 wherein the review generator module further determines the version of the App.

17. A non-transitory computer-readable medium having a computer readable program code tangibly embodied therein, the computer readable program code adapted to be executed by a processor to implement a method for collaborative software development in an integrated development environment (IDE), comprising:
 retrieving an application (App) identifier by a collaboration component in the IDE, wherein the App identifier links to a version of an App for a collaborative activity;
 automatically posting, without human intervention, a request for review message associated to the collaborative activity in a social network, content of the request for review message comprising indications of a status of the App, a version of the App, a request to review, the social network being external to the IDE and allowing a plurality of authorized users to review the message and comment on same, wherein
 if the version of the App for review is a first version which is a newly created App, the request for review message includes creating a new review topic for reviewing the App, the newly created review topic not including any previously generated messages, and
 if the App for review is not newly created, the request for review message includes posting a follow-up or reply message to a previously created review topic related to the App, the previously created review topic including previously generated messages;
 generating, in response to a single mouse click in the IDE, a collaboration identifier for the version of the App, wherein the collaboration identifier is unique to the version of the App, the collaboration identifier includes a direct link to the collaboration component, the collaboration identifier comprises
 the App identifier, the App identifier links to the version of the App,
 a message identifier that links to the message posted in the social network and allows for review and/or retrieval of such messages,
 an IDE identifier that links to the collaboration component in the IDE; and
 sending the collaboration identifier to one or more other users of the collaboration, wherein the one or more other users of the collaboration access the collaboration component and the version of the App directly using the collaboration identifier; and
 rendering, by a collaboration component using the App identifier, a user interface configured to manage and trace change requests from the one or more other users to the first user to make changes to the App, wherein the user interface rendered by the collaboration component is configured to allow the user to post and view messages that are published in the social network.

18. The non-transitory computer-readable medium of claim 17 wherein the program code is executable by the processor to redirect the one or more other users by a web browser to a web page of the collaboration component using the collaboration identifier.

19. The non-transitory computer-readable medium of claim 17 wherein the user interface is configured to present:
- an application panel that displays the version of the App; and
- a discussion panel that displays messages, wherein the messages are located in the social network.

* * * * *